Feb. 23, 1954   R. F. BREWER   2,669,770
METHOD OF FORMING ARTICLES

Filed April 12, 1950   2 Sheets-Sheet 1

INVENTOR
R. F. BREWER
BY *W. C. Parnell*
ATTORNEY

Feb. 23, 1954  R. F. BREWER  2,669,770
METHOD OF FORMING ARTICLES
Filed April 12, 1950  2 Sheets-Sheet 2
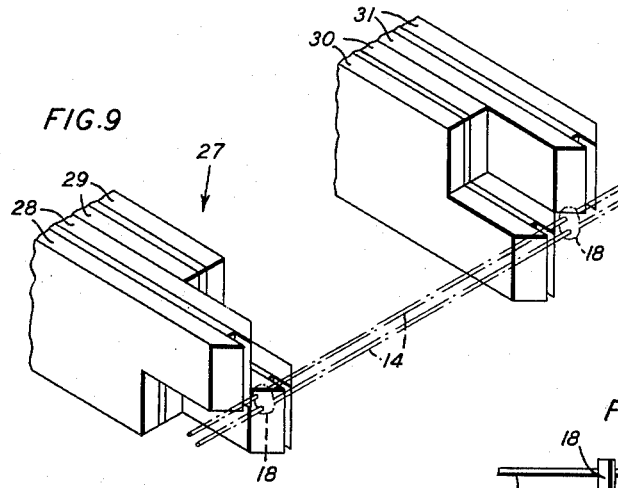
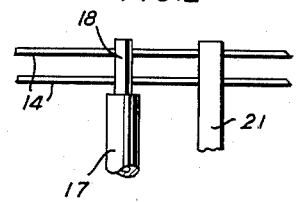
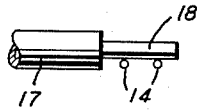
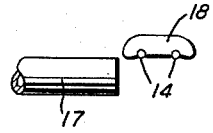
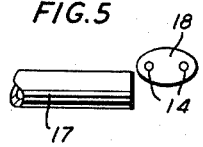
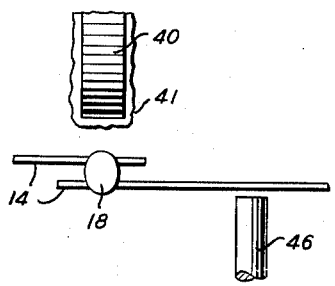
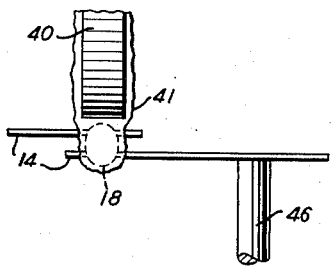
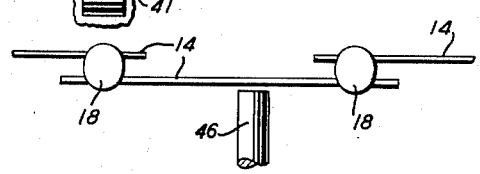
INVENTOR
R. F. BREWER
BY
W. C. Parnell
ATTORNEY Patented Feb. 23, 1954

2,669,770

UNITED STATES PATENT OFFICE 2,669,770

METHOD OF FORMING ARTICLES

Robert F. Brewer, Quakertown, Pa., assignor to Western Electric Company, Incorporated, New York, N. Y., a corporation of New York Application April 12, 1950, Serial No. 155,501

10 Claims. (Cl. 29—155.5)

This invention relates to a method of forming articles and more particularly to a method of forming thermistor units with lead wires.

A particular type of thermistor unit, including a bead of thermistor material with spaced lead wires had heretofore been constructed by hand, depending largely upon the skill of the operator to place the desired amount of thermistor material on the wires and causing the material to settle as uniformly as possible about the wires. The lead wires are exceedingly fine requiring careful attention of the operator to avoid breakage. Furthermore, by depending solely upon the skill of the operator, the quantities of thermistor material placed on the wires was not always uniform.

The object of the present invention is to provide a method of accurately forming articles such as thermistors which will be uniform both mechanically and electrically.

With this and other objects in view, the invention comprises a method for advancing strands longitudinally, depositing material on the strands at spaced positions and heating the material to solidify it in the form of beads on the strands.

More specifically, the method is for forming thermistor units, the strands being parallel wires which eventually will serve as leads or terminals for the thermistor beads. The thermistor beads result from quantities of material which are initially soft due to their moisture content, placed in equal quantities at spaced positions on the wires, after which the wires are agitated to cause the material to settle uniformly about the wires. The beads on the wires then pass through an oven where the moisture is driven from the material to solidify it and later move past burners, after which portions are cut from the wires at alternately spaced positions before the beads are finally annealed in a furnace. One of the final steps of the method includes the coating of each bead with liquid glass and heat treating the coated bead to solidify and anneal the glass thereon.

Other objects and advantages will be apparent from the following detailed description when considered in conjunction with the accompanying drawings, wherein Fig. 1 is a schematic front elevational view of the apparatus selected for the practice of the method;

Fig. 2 is a fragmentary top plan view of the nozzle of the applicator unit about to place a measured quantity of the material on the wires and the adjacent arm of the agitating unit for agitating the wires;

Fig. 3 is a fragmentary detailed view illustrating the side of the applicator nozzle just prior to the placing of a measured quantity of the material on the wires;

Fig. 4 is a view of the structure shown in Fig. 3 just after the material is placed on the wires;

Fig. 5 is a detailed view of the structure shown in Fig. 4 illustrating the result of the agitator unit in settling the material uniformly on the wires;

Fig. 6 is a fragmentary top plan view of the wires with a bead about to be moved toward the applicator wheel where it will be coated with liquid glass;

Fig. 7 illustrates the structure shown in Fig. 6 during the coating of the bead resulting from lateral movement of the wires and bead toward the applicator wheel;

Fig. 8 illustrates the next step of the coating operation after the bead has been coated; and Fig. 9 is a fragmentary isometric view of the wire cutting unit.

Figure 1:
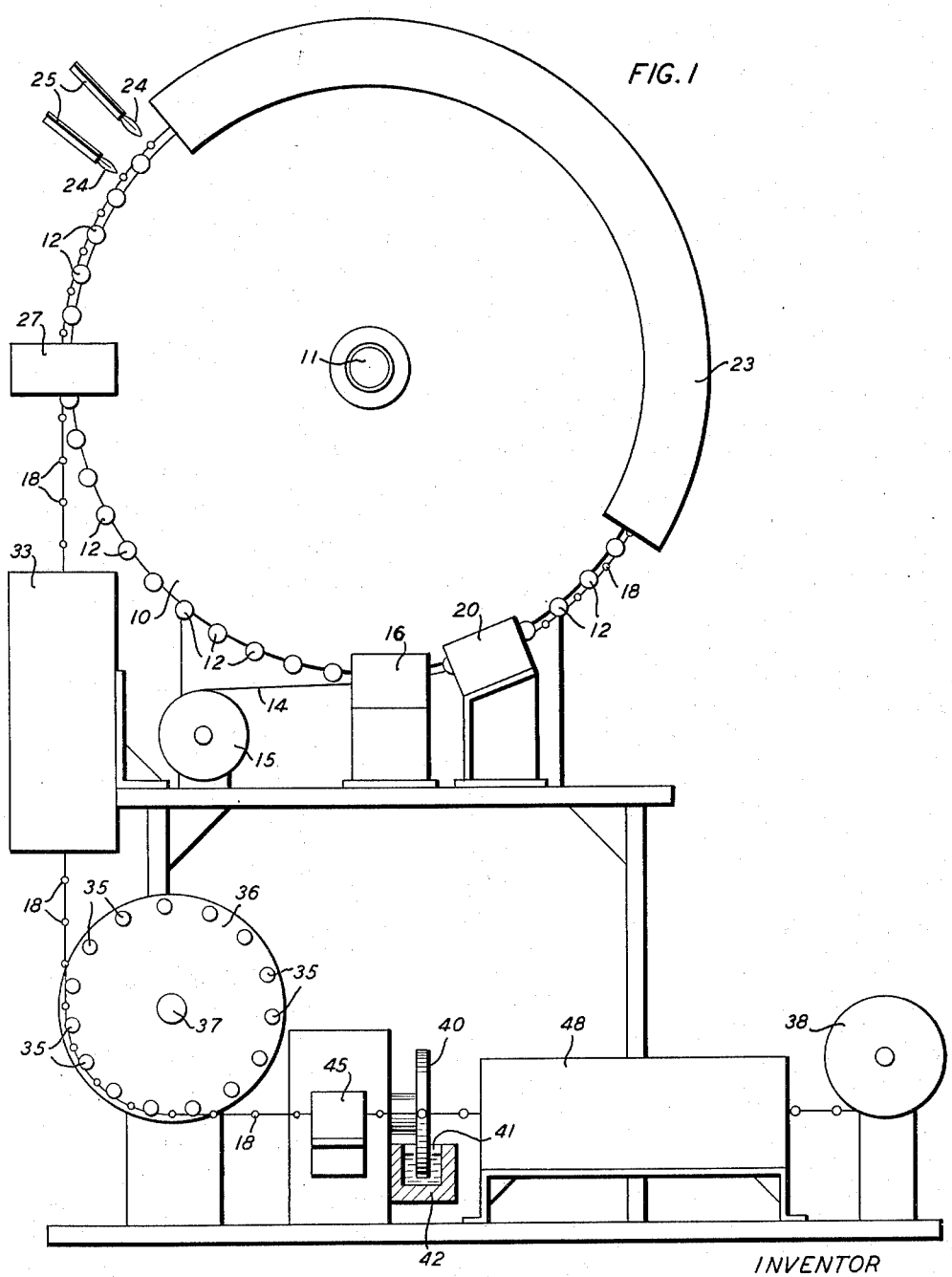

Referring now to the drawings, attention is first directed to Fig. 1 which illustrates a wheel 10 mounted for rotation on a shaft 11 and driven at a given speed counterclockwise by suitable power means (not shown). The wheel is provided with equally spaced units 12 to grip or otherwise support wires 14 received from supply reels 15 (only one of which is shown) to thereby advance the wires at equally spaced positions and at a given speed. An applicator unit 16 is the subject matter of the copending application of R. F. Brewer and C. W. Henderson, Serial No. 155,504, filed April 12, 1950, now Patent No. 2,587,234, issued February 26, 1952. This unit includes a hollow feeding element 17 through which measured quantities of material 18 are forced intermittently, during movement of the element 17 in a given path in timed relation with the rotation of the wheel 10, whereby the measured quantities of material 18 will be applied in equally spaced positions, for example, between the units 12 on the wheel. These quantities of material as shown in Figs. 2 to 5, inclusive, are initially placed on top of the wires during the downward movement of the element 17 and while the material is wiped free of the element on the wires the material will be partially formed about the wires as shown in Fig. 4.

An agitator unit 20 includes an arm 21 which is intermittently moved into and out of engagement with the wires so that it will be positioned away from the wires to allow the last formed bead to advance relative thereto and moved into engagement with the wires during the forming of the next bead. The arm 21 is vibrated by a suitable means (not shown) in the unit 20 to vibrate the wires as the arm rests thereon, causing the material 18 to settle about the wires from the condition shown in Fig. 4 to that illustrated in Fig. 5, thus forming the uniform bead of the material about the wires.

The material 18, when initially placed on the wires is soft due to its moisture content so that it may, through the application step and the vibrating step, be converted into beads joining and symmetrically disposed with respect to the two wires 14.

The clamping units 12, although supported by the periphery of the wheel 10, extend outwardly in front of the wheel so that the wires 14 will be positioned forwardly of the plane of the front surface of the wheel allowing free movement of the material on to the wires and also free movement of the arm 21 into and out of engagement with the wires. An oven 23 covers the periphery of the wheel 10 and the units 12 for a given distance and contains suitable heating elements to heat the beads of material 18 to drive the moisture therefrom and to solidify the beads on the wires. Pinpoint flames 24 from burners 25 are positioned to further heat treat the beads as they leave the oven.

A cutting unit 27 which is the subject matter of the applicant's copending application, Serial No. 155,502, filed April 12, 1950, now Patent No. 2,621,277, issued December 9, 1952, includes means for cutting portions of given lengths from the wires at alternately spaced positions. In the present embodiment of the invention, the unit 27 includes pairs 28, 29, 30 and 31 of electrical contacts moved at given intervals into engagement with the wires 14 to include portions of the wires in electrical circuits with the contacts whereby those portions will be burned or otherwise cut from the wires. The next step of the method utilizes a furnace 33 through which the remaining wires with their beads travel to complete the heat treatment of the beads. After the wires with the beads leave the furnace 33, they are received by units 35 which are similar to the units 12 mounted at spaced positions on a wheel 36 supported for rotation at 37. The beads on the wires in traveling to a takeup reel or drum 38 move in a given path relative to an applicator wheel 40 which is driven whereby its periphery will travel through a coating material such as liquid glass 41 in a container 42 to maintain a continuous supply of the material on the periphery of the wheel at a position adjacent the beads 18. A unit 45, as disclosed in the applicant's copending application, Serial No. 155,503, filed April 12, 1950, now Patent No. 2,597,613, issued May 20, 1952, includes a plunger 46 of a solenoid (not shown) energized intermittently to cause the plunger 46 to engage the adjacent wire moving the wires laterally to the position shown in Fig. 7 where the bead will be moved into the material 41 and be completely coated therewith. The final step prior to the takeup drum 38 includes the passing of the coated beads through an oven 48 to heat or anneal the glass coating on the beads.

Considering now the steps of the method through the aid of the apparatus, it will be understood that the wheel 10, together with the wheel 36, the applicator wheel 40 and the takeup drum 38 are driven in timed relation with each other so that the wires 14 will be initially pulled from their supply reels 15 and advanced in a given path about the wheel 10, the wheel 36 and on to the takeup drum 38. Considering the advancement of the wire, the first step of the method, the second step includes the application of the material 18 in a measured quantity to the wires, followed by the step of agitating or vibrating the wires to uniformly settle the material in the form of a bead about the two parallel wires. The next step includes heating the bead to remove the moisture therefrom and to solidify it on the wires assisted by the additional heat applied by the burners 25. The next step includes the cutting of alternate portions from the wires by including the ends of these portions in electrical circuits through the aid of the pairs of contacts to burn the portions or the ends thereof causing removal of alternate lengths from the wires in between the beads. The next step includes the final annealing of the beads as they pass through the furnace 33 preparing them to receive the protective glass coating as they advance relative to the applicator wheel 40. The final step of the method, namely the heating and annealing of the glass coating on the beads, completes a series of thermistor units each comprising a bead-like formation of thermistor material on spaced wires which, when cut to sever the units from each other, form terminals or lead wires for the thermistor unit.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. The method of forming bead-like articles of a material, which is initially soft due to its moisture content, on spaced strands comprising advancing parallel strands longitudinally, moving measured quantities of the material at spaced positions transversely of the strands to thereby deposit the quantities of material on the strands, agitating the strands to cause the quantities of the material to settle uniformly in the form of beads about the strands.

2. The method of forming bead-like articles of a material, which is initially soft due to its moisture content, on spaced strands comprising advancing parallel strands longitudinally, moving measured quantities of the material at spaced positions transversely of the strands to thereby deposit the quantities of material on the strands, agitating the strands to cause the quantities of the material to settle uniformly in the form of beads about the strands, and heat treating the quantities of material to drive the moisture therefrom.

3. The method of forming bead-like articles of a material, which is initially soft due to its moisture content, on spaced strands comprising advancing parallel strands longitudinally, moving measured quantities of the material at spaced positions transversely of the strands to thereby deposit the quantities of material on the strands, agitating the strands to cause the quantities of the material to settle uniformly in the form of beads about the strands, heat treating the quantities of material to drive the moisture therefrom, and cutting portions from the strands intermediate the beads.

4. The method of forming bead-like articles of a material, which is initially soft due to its moisture content, on spaced strands comprising advancing parallel strands longitudinally, moving measured quantities of the material at spaced positions transversely of the strands to thereby deposit the quantities of material on the strands, agitating the strands to cause the quantities of the material to settle uniformly in the form of beads about the strands, heat treating the quantities of material to drive the moisture therefrom, and applying a protective coating of another material to the beads.

5. The method of forming thermistors comprising advancing a pair of conductor wires longitudinally at parallel spaced positions, moving quantities of thermistor material having a given moisture content at spaced positions transversely of the wires to thereby deposit the quantities of thermistor material on the wires, agitating the wires to cause the quantities of thermistor material to settle uniformly about the wires to form joining bead-like members, and heating the members to drive the moisture therefrom.

6. The method of forming thermistors comprising advancing a pair of conductor wires longitudinally at parallel spaced positions, moving measured quantities of thermistor material having a given moisture content at spaced positions transversely of the wires to thereby deposit the quantities of thermistor material on the wires, agitating the wires to cause the quantities of thermistor material to settle uniformly about the wires to form joining bead-like members, and heating the members to drive the moisture therefrom.

7. The method of forming thermistors comprising advancing a pair of conductor wires longitudinally at parallel spaced positions, moving measured quantities of thermistor material having a given moisture content at spaced positions transversely of the wires to thereby deposit the quantities of thermistor material on the wires, agitating the wires to cause the quantities of thermistor material to settle uniformly about the wires to form joining bead-like members, heating the members to drive the moisture therefrom, and covering the bead-like members with a protective coating of another material.

8. The method of forming thermistors comprising advancing a pair of conductor wires longitudinally at parallel spaced positions, moving measured quantities of thermistor material having a given moisture content at spaced positions transversely of the wires to thereby deposit the quantities of thermistor material on the wires, agitating the wires to cause the quantities of thermistor material to settle uniformly about the wires to form joining bead-like members, heating the members to drive the moisture therefrom, covering the bead-like members with liquid glass, and annealing the covering on the members.

9. The method of forming thermistors comprising advancing a pair of conductor wires longitudinally at parallel spaced positions, moving measured quantities of thermistor material having a given moisture content at spaced positions transversely of the wires to thereby deposit the quantities of thermistor material on the wires, agitating the wires to cause the quantities of thermistor material to settle uniformly about the wires to form joining bead-like members, heating the members to drive the moisture therefrom, and cutting alternate portions of given lengths from the wires between the beads.

10. The method of forming thermistors comprising advancing a pair of conductor wires longitudinally at parallel spaced positions, moving quantities of thermistor material having a given moisture content at spaced positions transversely of the wires to thereby deposit the quantities of thermistor material on the wires, agitating the wires to cause the quantities of thermistor material to settle uniformly about the wires to form joining bear-like members, heating the members to drive the moisture therefrom, directing the wires with the bead-like members through a furnace to anneal the members, covering the members with liquid glass, and directing the wires with the coated members through a furnace to anneal the glass coating on the members.

ROBERT F. BREWER.

References Cited in the file of this patent

UNITED STATES PATENTS

| Number | Name | Date |
| --- | --- | --- |
| 1,626,118 | Olin et al. | Apr. 26, 1927 |
| 1,956,737 | Walker et al. | May 1, 1934 |
| 1,958,841 | Bateholts | May 15, 1934 |
| 2,018,192 | Sexton | Oct. 22, 1935 |
| 2,111,426 | Hilbert | Mar. 15, 1938 |
| 2,196,258 | Erdle | Apr. 9, 1940 |
| 2,529,971 | Schmidinger | Nov. 14, 1950 |
| 2,577,584 | Hofreiter | Dec. 4, 1951 |

FOREIGN PATENTS

| Number | Country | Date |
| --- | --- | --- |
| 624,239 | France | Apr. 2, 1927 |